United States Patent [19]

Leiter

[11] 4,113,304
[45] Sep. 12, 1978

[54] SLIDING AND TILTING ROOF FOR A MOTOR VEHICLE

[75] Inventor: Robert Leiter, Krailling, Germany

[73] Assignee: Webasto-Werk W. Baier GmbH & Co., Germany

[21] Appl. No.: 863,709

[22] Filed: Dec. 23, 1977

Related U.S. Application Data

[63] Continuation of Ser. No. 772,675, Feb. 25, 1977, abandoned.

[30] Foreign Application Priority Data

Mar. 24, 1976 [DE] Fed. Rep. of Germany ....... 2612484

[51] Int. Cl.² .................................................. B60j 7/02
[52] U.S. Cl. .............................................. 296/137 G
[58] Field of Search ........... 296/137 G, 137 E, 137 H

[56] References Cited

U.S. PATENT DOCUMENTS 3,976,325  8/1976  Schätzler .................. 296/137 G
4,023,858  5/1977  Bienert ..................... 296/137 G Primary Examiner—Robert R. Song
Attorney, Agent, or Firm—Craig & Antonelli

[57] ABSTRACT

An improved arrangement for accommodating movement of a manual crank member for a sliding and tilting roof is provided. The crank member is drivingly connected to a shaft, which shaft is connected by a lost motion connection with a driving plate, which driving plate in turn includes a stop member engageable with a stop member on a driving gear connected for movement with the vehicle roof member. The lost motion connection between the shaft and the plate member corresponds to the angular rotation equivalent to the sum of the circumferential length of the stop members at the plate and the driven gear, so that the crank member can be freely returned to a single predetermined rotative position where it can be moved into a roof recess or the like to be concealed, irrespective of the position of the roof member.

9 Claims, 11 Drawing Figures

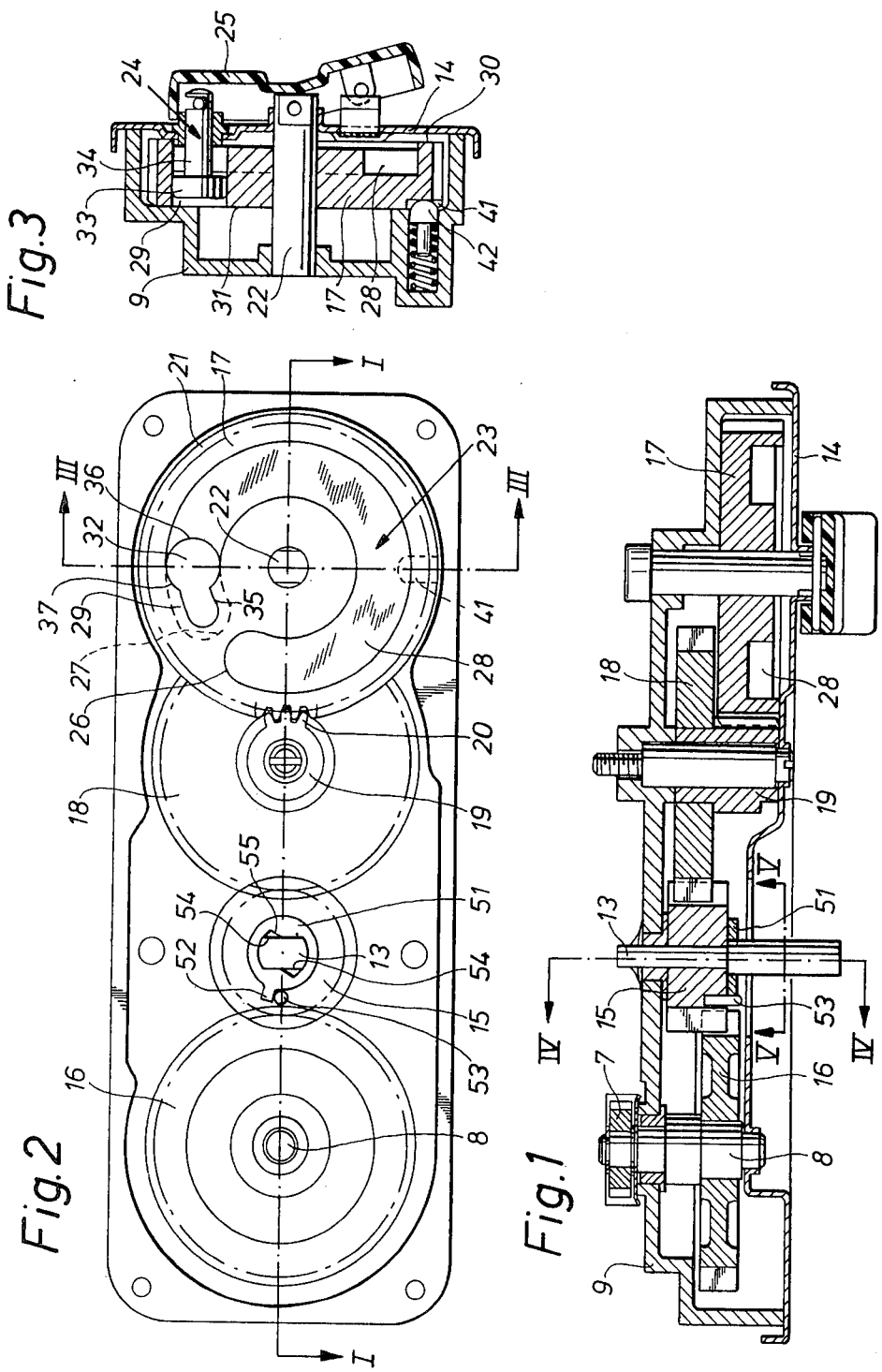

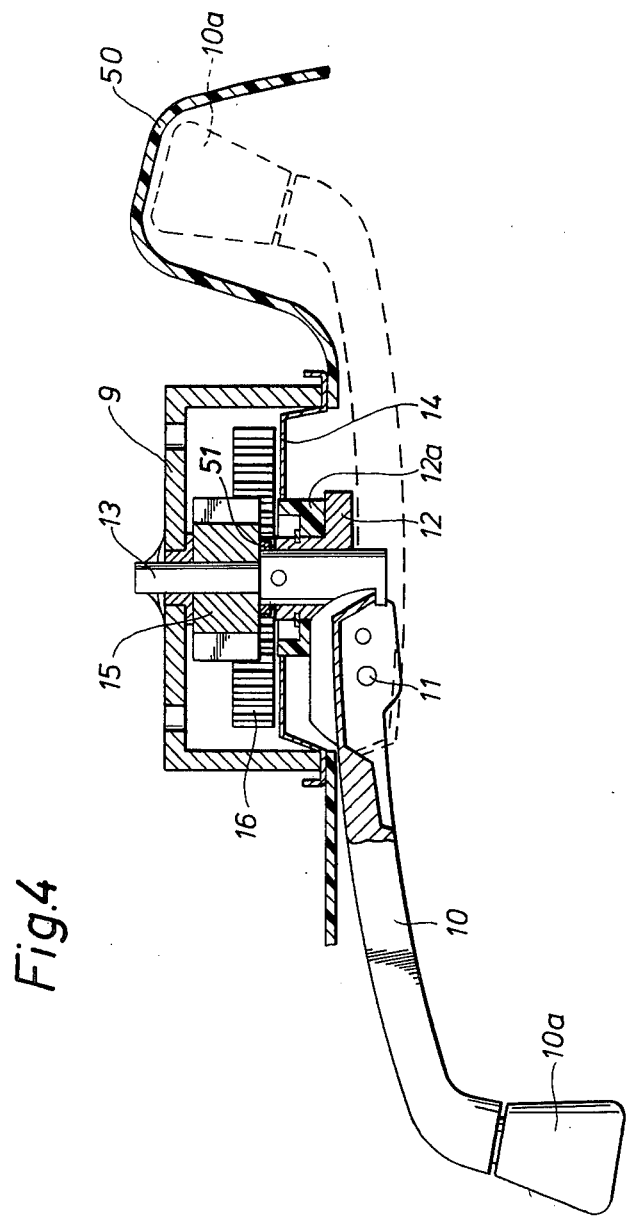

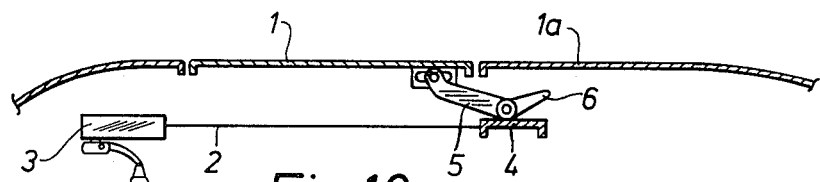
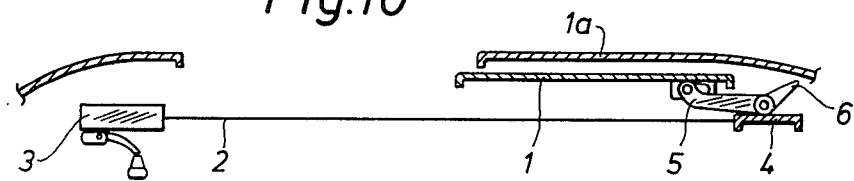
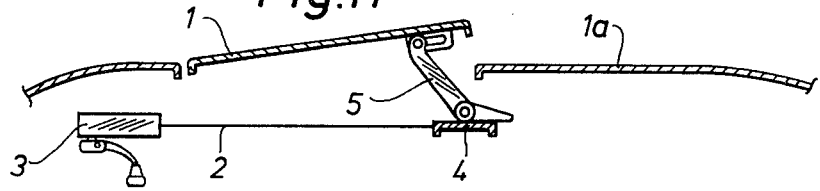
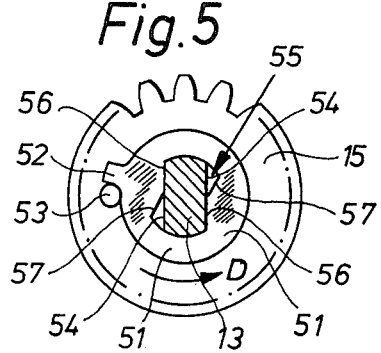
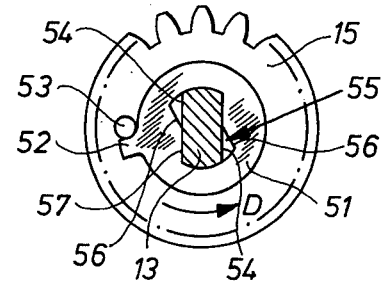
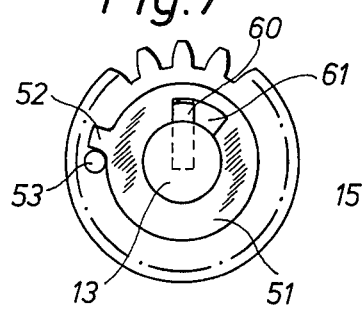
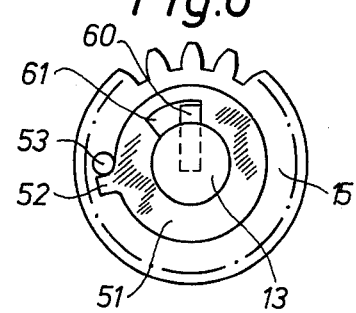

SLIDING AND TILTING ROOF FOR A MOTOR VEHICLE

This is a Continuation of application Ser. No. 772,675, filed Feb. 25, 1977, now abandoned.

BACKGROUND AND SUMMARY OF THE INVENTION

The invention relates to a sliding and tilting panel member arrangement, such as a roof for a motor vehicle, with a cover which is movable by a crank through a drive, said crank being nonrotatably mounted on a shaft, said shaft being provided with a gear, said gear having a drive pinion driveably connected with the roof-sliding mechanism, a saucer-shaped recess being provided in the headlining into which the crank can be folded in a certain position.

In such an arrangement if the crank is rigidly connected with the cover through the drive, the crank will be in a position in which it can be folded away into the recess when the roof is in only one or more specified positions. This disadvantage is insignificant for normal sliding roofs, since the operator can be expected to move the sliding roof to a position in which the crank arm can be folded away into the recess, inasmuch as half a turn of the crank, the maximum amount necessary to bring the crank arm into the folding position, does not result in an excessive displacement of the sliding cover. In the case of sliding and tilting roofs, however, the same conditions as described above in the case of a normal sliding roof apply to the sliding of the roof but not to the tilting of the cover, since only a few, for example two, turns of the crank are provided for tilting the cover and the crank can be folded away in the recess in only a few (only two in the example cited) tilted positions of the cover. However, it would be desirable for the crank to be folded away with the cover in any position. To achieve this goal, it has already been proposed (German Offenlegungsschrift 24 26 765) to provide a clutch which can be disengaged between the hub of the crank and the drive pinion, so that the crank can be disengaged from the drive mechanism at any time and with the roof in any position and can be rotated so that it can be folded away in the recess. However, a clutch of this type is relatively costly and requires special actuation by the operator, which is undesirable because the attention of the latter is distracted from the road.

Hence, an object of the invention is to make it possible to fold the crank away in the recess with the sliding and tilting roof in any position, using simple means and without the necessity for special actuation.

This object is achieved according to the invention by mounting the gear loosely on the shaft and providing a driving plate to rotate the gear by means of the shaft in both rotational directions, said driving plate being provided with a stop which cooperates with a stop on the gear, and by the fact that play is provided between the shaft and the driving plate, said play corresponding to the angular range determined by the sum of the lengths of the two stops as measured circumferentially.

The proposal according to the invention ensures that the crank, regardless of the position of the cover at the moment, can be brought into a position in which it can be folded away into the recess. A special advantage of the proposal according to the invention, however, lies in the fact that the crank, by virtue of the play provided, is automatically in the position in which it can be folded away into the recess when the cover is in its closed position, regardless of whether the cover was moved to the closed position from a tilted or a retracted position. If the shaft were rigidly coupled to the driving plate, on the other hand, the shaft would have to be turned back through approximately 300° after the cover reaches the closed position, in order to reach a position in which it could be folded away, since the stop on the driving plate would rest against one side or the other of the stop on the gear, depending on the rotational direction of the shaft, and the shaft would therefore be in a different position in the closed position which the cover assumes after being slid forward from a retracted position than it would have in the closed position which the cover reaches after being lowered from a tilted position.

According to certain preferred embodiments of the invention, the shaft is provided with parallel flattened areas in the vicinity of the driving plate, said flattened areas being on two opposite sides and parallel to one another, and the driving plate is provided with a hole to accept the flattened section of the shaft, the hole being designed so that it allows the shaft to rotate relative to the plate by the predetermined angular range in both rotational directions.

Alternatively, according to other preferred embodiments of the invention, the shaft is provided with a radially projecting pin in the vicinity of the driving plate, said pin extending into a recess in the plate corresponding to the desired amount of play, the ends of said recess forming stops for the pin.

These and other objects, features and advantages of the present invention will become more apparent from the following description when taken in connection with the accompanying drawings, which show, for purposes of illustration only, several embodiments in accordance with the present invention.

BRIEF DESCRIPTION OF THE DRAWINGS

FIG. 1 is a sectional view along line I—I in FIG. 2 through a drive mechanism for a sliding and tilting roof constructed in accordance with the present invention;

FIG. 2 is a bottom view of the drive mechanism shown in FIG. 1, with the lower cover plate of the housing removed;

FIG. 3 is a cross sectional view along line III—III in FIG. 2;

FIG. 4 is a sectional view along lines IV—IV in FIG. 1 and shows the hand crank;

FIG. 5 is a sectional view along line V—V in FIG. 1, showing the shaft, driving plate and gear in one position;

FIG. 6 is a sectional view similar to FIG. 5, showing the shaft, driving plate and gear in another position;

FIG. 7 is a sectional view similar to FIG. 5 through another embodiment of the invention, showing the shaft, driving plate and gear in one position;

FIG. 8 is a sectional view corresponding to FIG. 7, showing the shaft, driving plate, and gear in another position, FIG. 9 is a schematic representation of a motor vehicle roof with a sliding cover in the closed position;

FIG. 10 is a view similar to FIG. 9 showing the sliding cover slid backward beneath the fixed part of the roof; and FIG. 11 is a view similar to FIG. 9, showing the sliding roof in a tilted position.

DETAILED DESCRIPTION OF THE DRAWINGS

In the embodiment shown, cover 1 can be slid by means of an incompressible cable 2 through a crank mechanism 3 from the closed position shown in FIG. 9 either backward beneath the fixed part of the roof 1a (FIG. 10) or into the tilted position shown in FIG. 11. In the embodiment shown, cable 2 is attached to a carriage 4, said carriage carrying a lever mechanism 5, said mechanism attached on the one hand with cover 1 and on the other hand at 6 in a crank guide, not shown. Sliding and tilting roofs of this type are known and described for example in German Offenlegungsschrift 19 33 991.

The crank and drive mechanism for cover 1 is shown in detail in FIGS. 1 to 6. It is provided with a drive pinion 7, whose external teeth mesh with the incompressible cable 2 and which is mounted on a shaft 8, said shaft being rotatably mounted in a drive housing 9. Drive housing 9 is mounted on the vehicle roof in a manner known per se. Pinion 7 is driven by crank 10, mounted swivelably at 11 on a rotatable hub 12, said hub being connected in turn nonrotatably with a shaft 13. Shaft 13 is mounted in drive housing 9 and in hub 12. The hub 12 is mounted rotatably in turn in a bearing 12a, said bearing being mounted in drive housing 9. A gear 15 is mounted on shaft 13, said gear meshing with a gear 16 mounted on pinion shaft 8.

In order to provide a stop for crank 10 with cover 1 in the completely retracted position, in the closed position, and in the fully tilted position, a locking wheel 17 is provided in drive housing 9, said locking wheel being driven by gear 15 on shaft 13 through an intermediate gear 18 and a pinion 19 connected therewith. As shown in FIG. 2, pinion 19 has only three teeth, which mesh with the external teeth 21 of locking wheel 17. In this manner, by virtue of the ratio of the number of teeth on gears 15 and 18, the high transmission ratio is created which is required to ensure that the number of turns of the crank which are required to move the cover from its fully tilted position as shown in FIG. 11 through the closed position as shown in FIG. 9 into its fully retracted position as shown in FIG. 10 does not quite correspond to one revolution of locking wheel 17. Locking wheel 17 is rotatably mounted on a shaft 22 mounted in housing 9 and is provided with a concentric crank slot 23, into which a locking pin 24 fits, said pin being mounted on the end of a rocker 25, said rocker being rotatably mounted on shaft 22 of the locking wheel. The length of the crank slot 23 is determined so that the locking pin is at one end 26 of the crank slot 23 when cover 1 is fully retracted and at the other end 27 of crank slot 23 when cover 1 is fully tilted. In order to indicate to the operator when cover 1 is in its closed position, crank slot 23 is divided into two sections 28 and 29, with section 28 being provided in the under side 30 of locking wheel 17 and section 29 being provided in the upper side 31 of locking wheel 17. The ends of the two sections 28 and 29, which face one another, overlap and form a through opening 32 for the head 33 of locking pin 24 when cover 1 is in the closed position. The diameter of head 33 corresponds to the width of crank slot sections 28 and 29. In order to guide locking pin 24 in section 29, section 28 extends into section 29 at 35, but its width is reduced such that it corresponds to the diameter of shaft 34 of locking pin 24.

With locking pin 24 in the position shown in FIG. 3, its head 33 rests against end 36 (FIG. 2) of crank slot 29, i.e., cover 1 is in its closed position. Rotation of crank 10 to tilt cover 1 is possible only until head 33 of locking pin 24 strikes end 27 of crank slot section 29. If cover 1 is to be slid backward from the closed position, locking pin 24 with head 33 is withdrawn from crank slot section 29 until it enters crank slot section 28. This is accomplished by switching over rocker 25. When crank 10 is rotated to slide cover 1 backward, locking wheel 17 also rotates until head 33 of locking pin 24 strikes the other end 26 of the crank slot 23. When cover 1 has again reached its closed position after being slid forward, head 33 of locking pin 24 rests against end 37 of crank slot 28. It is only with locking wheel 17 in this position that head 33 of locking pin 24 can be transferred from one crank slot section to the other.

In order to locate the cover in the exact closed position despite manufacturing tolerances, locking wheel 17 is provided with a recess 41 into which a spring-loaded locking element fits when locking wheel 17 is in the position which corresponds to the closed position of cover 1. Co-pending commonly assigned U.S. application Ser. No. 743,987, filed Nov. 22, 1976 also includes details of a crank stop arrangement.

As can be seen from FIG. 4, crank 10 is swivelably mounted on hub 12 at 11, so that it can be swiveled until crank handle 10a disappears into a recess 50 in the headlining or in a cover plate. Due to limited space, this recess 50 is provided only in one radial direction. If shaft 13 were rigidly coupled to gear 15, crank 10 could be folded away into recess 50 in only one position during each revolution. In order to be able to fold away crank 10 after only a partial revolution, play is provided between gear 15 and shaft 13, said play being provided by virtue of the fact that a driving plate 51 is mounted on shaft 13, said plate being provided with a stop 52 which cooperates with a stop 53 on gear 15. In addition, play is provided between shaft 13 and driving plate 51, said play corresponding to the angular range determined by the sums of the lengths of the two stops 52 and 53 measured circumferentially. In the embodiment shown in FIGS. 2 to 6, this play is provided by the fact that shaft 13 is provided with flattened areas 54 in the vicinity of driving plate 51, said flattened areas being on opposite sides and parallel to one another, and by the fact that the driving plate 51 is provided with an opening 55 to accept the flattened portion of the shaft, said opening being designed so that it allows rotation of shaft 13 relative to driving plate 51 by the predetermined angular range in both rotational directions. The purpose of this play is described below with reference to FIGS. 5 and 6.

With shaft 13, driving plate 51 and gear 15 in the position shown in FIGS. 2 and 5, assume that cover 1 is in the closed position and the revolution of shaft 13 in the direction of arrow D tilts cover 1. Then flattened areas 54 rest against surfaces 56 of opening 55 in driving plate 51. If the crank is to be folded away into its recess with cover 1 in any desired tilted position, crank 10 can be rotated freely opposite to the direction of rotation D shown in FIG. 5 until shaft 13 has reached the position shown in FIG. 5, in which crank 10 can be folded away. Shaft 13 initially rotates with complete freedom until its flattened areas 54 come to rest against surfaces 57 of opening 55. If the crank is turned further, driving plate 51 is engaged. This position of shaft 13 relative to plate 51 is shown in FIG. 6. If cover 1 is now to be lowered from a tilted position, shaft 13 is rotated by the crank in the direction opposite to direction D, and driving plate 51 is engaged as shown in FIG. 6 until its stop 52 strikes stop 53 on gear 15. As the crank is rotated further, gear 15 is engaged, causing cover 1 to be lowered until it has reached its closed position as shown in FIG. 9, in which shaft 13 is again in the same position as shown in FIG. 5 and crank 10 can therefore be folded away into its recess 50. If cover 1 is to be moved from the closed position shown in FIG. 9 to a retracted position, for example as shown in FIG. 10, shaft 13 is rotated further in the direction opposite to direction D, with driving plate 51 being engaged and gear 15 being rotated by driving elements 52 and 53. If cover 1 is to be moved from the retracted position as shown in FIG. 10 back to the closed position as shown in FIG. 9, shaft 13 is again rotated in direction D from the position shown in FIG. 6 by crank 10. This means that the play between shaft 13 and driving plate 51 must first be overcome in order to bring flattened areas 54 in contact with surfaces 56, and then driving plate 51 is engaged until its stop 52 strikes stop 53, as shown in FIG. 5. When the cover reaches the closed position, shaft 13 is in the position shown in FIG. 5, in which crank 10 can be folded away. The fact that shaft 13 and hence crank 10 are always in a position, when cover 1 is in the closed position, such that crank 10 can be folded away into recess 50, regardless of which side of stop 53 stop 52 rests against, depends upon the play between shaft 13 and driving plate 51, as clearly shown in FIGS. 5 and 6. This play corresponds to the sum of the lengths of the two stops 52 and 53 measured circumferentially. If shaft 13 were rigidly connected to drivng plate 51, shaft 13, after rotating gear 15 in rotational direction D, in order to move cover 1 to the closed position, would be in a position such that the crank could be folded away. However, if the shaft has rotated the gear opposite to rotational Direction D, in order to move cover 1 from a retracted position to the closed position, stop 52 will rest against the other side of stop 53 in the closed position, as shown in FIG. 6. In this case, if shaft 13 were rigidly connected with driving plate 51, and they were in the relative positions shown in FIG. 5, they would be located diagonally with respect to each other and crank 10 could not be folded away. Instead, shaft 13 together with driving plate 51 would first have to be rotated loosely to the position shown in FIG. 5 until the crank could be folded away. The abovementioned play provided between shaft 13 and driving plate 51 eliminates this unnecessary operation.

FIGS. 7 and 8 show the same positions as FIGS. 5 and 6 in a slightly different embodiment of the invention. Here the driving connection between shaft 13 and driving plate 51 is formed by a pin 60 extending radially from shaft 13, said pin meshing with a segmental cutout 61 in driving plate 51 and resting against one end or the other of the cutout depending on the rotational direction of shaft 13. This ensures the same play between shaft 13 and driving plate 51, as was provided in the first embodiment by flattened areas 54 on shaft 13 and the shape of the opening 55 in driving plate 51 shown therein. The operation of the arrangement as shown in FIGS. 7 and 8 is the same as with the operation of the first embodiment of FIGS. 5 and 6 described above.

While we have shown and described only several embodiments in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

I claim:
1. Movable vehicle panel member apparatus including a vehicle panel member and driving means for moving said panel member with respect to adjacent vehicle structure, said driving means including:
- a rotatable driving member which is drivingly connected to move said panel member in response to rotational movements of said driving member, said driving member having a first stop member,
- a shaft,
- a crank member drivingly connected to said shaft for applying rotational movement to said shaft,
- and a driving plate carried by said shaft, said driving plate having a second stop member engageable with said first stop member to rotate said driving member along with said driving plate, said first and second stop members occupying a small circumferential length of said driving member and driving plate so that said driving plate can be freely rotated from a first position with the second stop member engaging one circumferential side of said first stop member to a second position with the second stop member engaging an oppositely facing circumferential side of said first stop member,
- said shaft and said driving plate being connected by lost motion connecting means permitting free relative rotational movement corresponding to the angular range determined by the circumferential lengths of the first and second stop members,
- whereby said crank member can be freely returned to a predetermined rotated position for movement to a concealed position, irrespective of the rotative position of the drive member.

2. Apparatus according to claim 1, wherein said vehicle panel member is a roof panel member.

3. Apparatus according to claim 2, wherein said driving means includes means for tiltingly and slidingly moving said panel member with respect to adjacent vehicle structure.

4. Apparatus according to claim 3, wherein said driving member is a gear mounted loosely on the shaft.

5. Apparatus according to claim 4, wherein the shaft is provided with flattened areas in the vicinity of the driving plate, said flattened areas being on two opposite sides and parallel to one another, and wherein the driving plate is provided with an opening to accept the flattened areas of the shaft, said opening being so designed that it allows rotation of the shaft relative to the driving plate by the predetermined angular range in both rotational directions.

6. Apparatus according to claim 4, wherein the shaft is provided with a radially projecting pin in the vicinity of the driving plate, said pin extending into a recess in the driving plate, said recess corresponding to the desired amount of play, and with the ends of said plate constituting stops for pin.

7. Apparatus according to claim 1, wherein the shaft is provided with flattened areas in the vicinity of the driving plate, said flattened areas being on two opposite sides and parallel to one another, and wherein the driving plate is provided with an opening to accept the flattened areas of the shaft, said opening being so designed that it allows rotation of the shaft relative to the driving plate by the predetermined angular range in both rotational directions.

8. Apparatus according to claim 1, wherein the shaft is provided with a radially projecting pin in the vicinity of the driving plate, said pin extending into a recess in the driving plate, said recess corresponding to the desired amount of play, and with the ends of said plate constituting stops for pin.

9. Movable vehicle panel member apparatus including a vehicle panel member and driving means for moving said panel member with respect to adjacent vehicle structure, said driving means including:

a rotatable driving member which is drivingly connected to move said panel member in response to rotational movements of said drivng member, said driving member having a first stop means, a shaft, a crank member drivingly connected to said shaft for applying rotational movement to said shaft, and transmission means carried by said shaft, said transmission means forming a second stop means engageable with said first stop means to rotate said driving member along with said transmission means, said first and second stop means being arranged so that said transmission means can be freely rotated from a first position with the second stop means engaging one circumferential surface of said first stop means to a second position with the second stop means engaging an oppositely facing circumferential surface of said first stop means, said shaft and said transmission means being connected by lost motion connecting means permitting free relative rotational movement corresponding to the angular range determined by the circumferential lengths of the first and second stop means, whereby said crank member can be freely returned to a predetermined rotated position for movement to a concealed position, irrespective of the rotative position of the drive member.

* * * * *